(12) United States Patent
Lord et al.

(10) Patent No.: US 11,663,671 B2
(45) Date of Patent: May 30, 2023

(54) RISK RELATIONSHIP RESOURCE ALLOCATION SERVICING SYSTEM AND METHOD

(71) Applicant: Hartford Fire Insurance Company, Hartford, CT (US)

(72) Inventors: Erik R. Lord, Sorrento, FL (US); Thomas F. Morgan, Wethersfield, CT (US); Brian L. Fresher, Haddam, CT (US); Armand J. Minutillo, Farmington, CT (US); Cynthia D Finley, Lyme, CT (US); Marie C. Norcia, Spencer, MA (US); Jonathan Brown, Glastonbury, CT (US); Willis D Schmidt, Jr., Southington, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 114 days.

(21) Appl. No.: 16/253,734

(22) Filed: Jan. 22, 2019

(65) Prior Publication Data
US 2020/0234376 A1   Jul. 23, 2020

(51) Int. Cl.
*G06Q 40/00* (2023.01)
*G06Q 40/08* (2012.01)
*G06Q 10/0631* (2023.01)

(52) U.S. Cl.
CPC ....... *G06Q 40/08* (2013.01); *G06Q 10/06315* (2013.01)

(58) Field of Classification Search
CPC ... G06Q 40/08; G06Q 10/06; G06Q 10/06315

USPC ................................................. 705/4, 35–45
See application file for complete search history.

(56) References Cited

U.S. PATENT DOCUMENTS

| | | |
|---|---|---|
| 5,191,522 A | 3/1993 | Bosco et al. |
| 8,799,026 B2 | 8/2014 | Rehor et al. |
| 10,057,313 B2 | 8/2018 | Juan et al. |
| 2016/0104246 A1 | 4/2016 | McLaughlin et al. |
| 2018/0165767 A1* | 6/2018 | Faherty ............. G06Q 40/08 |
| 2018/0253670 A1* | 9/2018 | Sommer ............. G06Q 40/08 |
| 2018/0332091 A1 | 11/2018 | Juan et al. |
| 2019/0012743 A1* | 1/2019 | Resutek ............. G06Q 40/08 |
| 2020/0184567 A1* | 6/2020 | Banks ............... G06Q 40/08 |
| 2020/0202267 A1* | 6/2020 | Servidone ......... G06Q 10/10 |

* cited by examiner

*Primary Examiner* — Jessica Lemieux
*Assistant Examiner* — Mohammed H Mustafa
(74) *Attorney, Agent, or Firm* — Buckley, Maschoff & Talwalkar LLC

(57) ABSTRACT

A system may receive a first resource allocation request (associated with a first company) from a first entity. The system may determine that the first request is not associated with a risk relationship and arrange for it to be processed via a claim servicing entity. Information about the first request may then be routed to a request handler device for processing and a communication with a first graphical indication may be generated. The system may also receive a second resource allocation request (associated with the first company) from a second entity and determine that it is to be processed via a risk. The system may then route information about the second request to a request handler device for processing and generate a communication with a second graphical indication. Note that the request handler device may be the same device that received the information about the first request.

20 Claims, 14 Drawing Sheets

RISK RELATIONSHIP RESOURCE ALLOCATION SERVICING SYSTEM AND METHOD

BACKGROUND

It may be advantageous to protect against unexpected risks, such as those associated with computer systems and/or risk relationship agreements. For example, it might be advantageous for a company to purchase a typical insurance policy, such as a workers' compensation insurance policy. Such policies generally have the insurer process claims received from claimants. In other cases, a company may prefer to "self-insure" and another party may process claims received from claimants. In still other circumstances, a company might want to process some claims under an insurance policy while other claims are self-insured. Implementing such a hybrid approach, however, can be a difficult task for an insurer (e.g., in connection with issues associated with certificates of insurance, receiving collateral from the company, different rules and regulations in various states, etc.).

It would be desirable to provide systems and methods to provide risk relationship resource allocation request servicing in a way that provides faster and more efficient results as compared to traditional approaches.

SUMMARY OF THE INVENTION

According to some embodiments, systems, methods, apparatus, computer program code and means are provided to provide risk relationship resource allocation request servicing in a way that provides faster and more efficient results as compared to traditional approaches and that allow for flexibility and effectiveness when processing those requests. In some embodiments, a system may receive a first resource allocation request (associated with a first company) from a first entity. The system may determine that the first request is not associated with a risk relationship and arrange for it to be processed via a claim servicing entity. Information about the first request may then be routed to a request handler device for processing and a communication with a first graphical indication may be generated. The system may also receive a second resource allocation request (associated with the first company) from a second entity and determine that it is to be processed via a risk. The system may then route information about the second request to a request handler device for processing and generate a communication with a second graphical indication. Note that the request handler device may be the same device that received the information about the first request.

Some embodiments comprise: means for receiving, by a computer processor of the back-end application computer server, a first resource allocation request from a first entity, the first resource allocation request being associated with a first company; means for automatically determining that the first resource allocation request is not associated with a risk relationship between the enterprise and the first company; based on the automatic determination, means for arranging for the first resource allocation request to be processed via a claim servicing entity; means for routing information about the first resource allocation request to a request handler device of the enterprise for processing; means for automatically generating a first communication with a first graphical indication in connection with the first resource allocation request; means for receiving a second resource allocation request from a second entity, the second resource allocation request being associated with the first company; means for automatically determining that the second resource allocation request is to be processed in accordance with a risk relationship between the enterprise and the first company; means for routing information about the second resource allocation request to a request handler device of the enterprise for processing, wherein the request handler device may be the same device that received the information about the first resource allocation request; and means for automatically generating a second communication with a second graphical indication in connection with the second resource allocation request, wherein the second graphical indication is different than the first graphical indication.

In some embodiments, a communication device associated with a back-end application computer server exchanges information with remote devices in connection with an interactive graphical user interface. The information may be exchanged, for example, via public and/or proprietary communication networks.

A technical effect of some embodiments of the invention is an improved and computerized way to provide risk relationship resource allocation request servicing in a way that provides faster and more efficient results as compared to traditional approaches. With these and other advantages and features that will become hereinafter apparent, a more complete understanding of the nature of the invention can be obtained by referring to the following detailed description and to the drawings appended hereto.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access, and/or accuracy of communications between devices by implementing a specific new method and system as defined herein. The present invention is a specific advancement in the area of electronic risk protection by providing benefits in data accuracy (e.g., ensuring that resource allocation requests are handled in an efficient and accurate fashion), data availability, and data integrity and such advances are not merely a longstanding commercial practice. The present invention provides improvement beyond a mere generic computer implementation as it involves the processing and conversion of significant amounts of data, from multiple sources, in a new beneficial manner as well as the interaction of a variety of specialized client and/or third-party systems, networks, and subsystems. For example, in the present invention information may be processed, updated, and analyzed via a back-end-end application server to accurately improve processing of resource allocation requests, thus improving the overall efficiency of the system associated with message storage requirements and/or bandwidth considerations (e.g., by reducing the number of messages that need to be transmitted via the network). Moreover, embodiments associated with collecting accurate information might further improve risk values, predictions of risk values, allocations of resources, electronic record processing decisions, etc.

Figure 1:
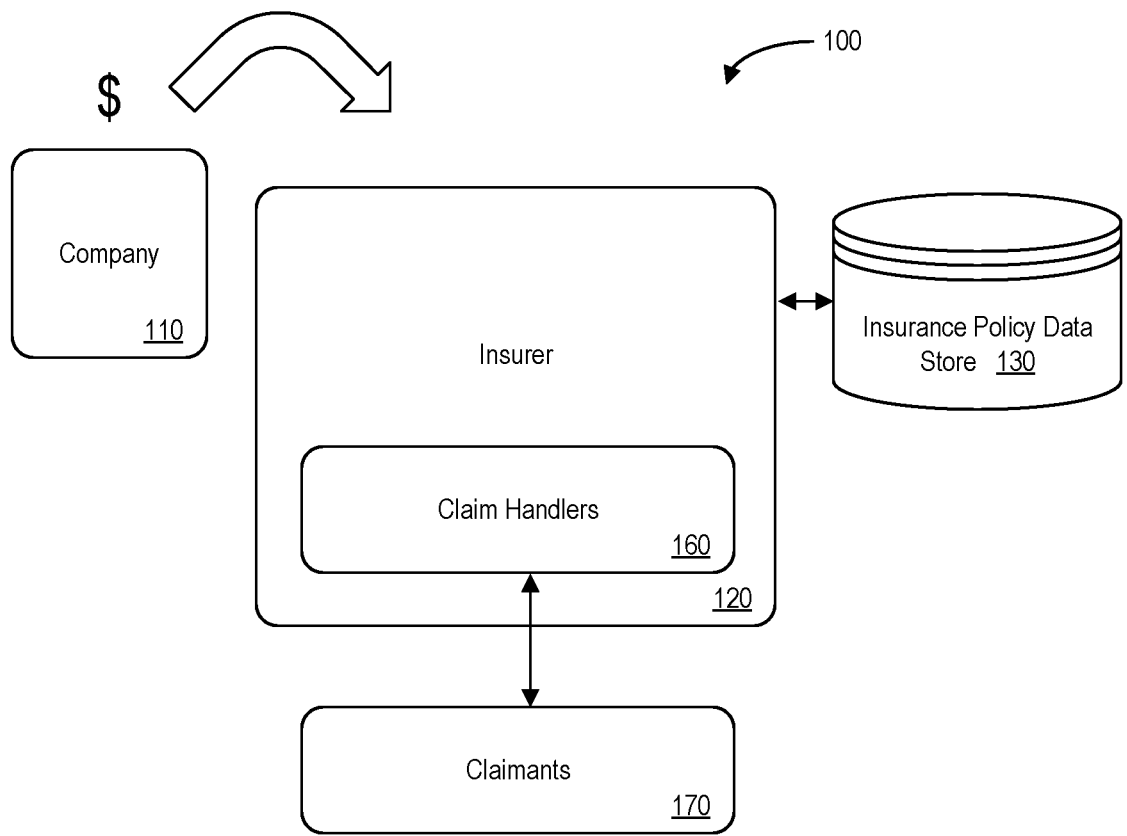
FIG. 1 is a high-level block diagram of a traditional workers' compensation insurance arrangement.

FIG. 1 is a high-level block diagram of a traditional workers' compensation insurance arrangement 100. A company 110 may enter a risk relationship (e.g., a workers' compensation insurance agreement) with an insurer 120. Details about the relationship may be stored in an insurance policy data store 130 (e.g., a premium amount, terms and conditions, coverage information, etc.). Claim handlers 160 of the insurer 120 may process resource allocation requests (e.g., insurance claims) as they received from claimants 170 (e.g., injured workers).

Figure 2:
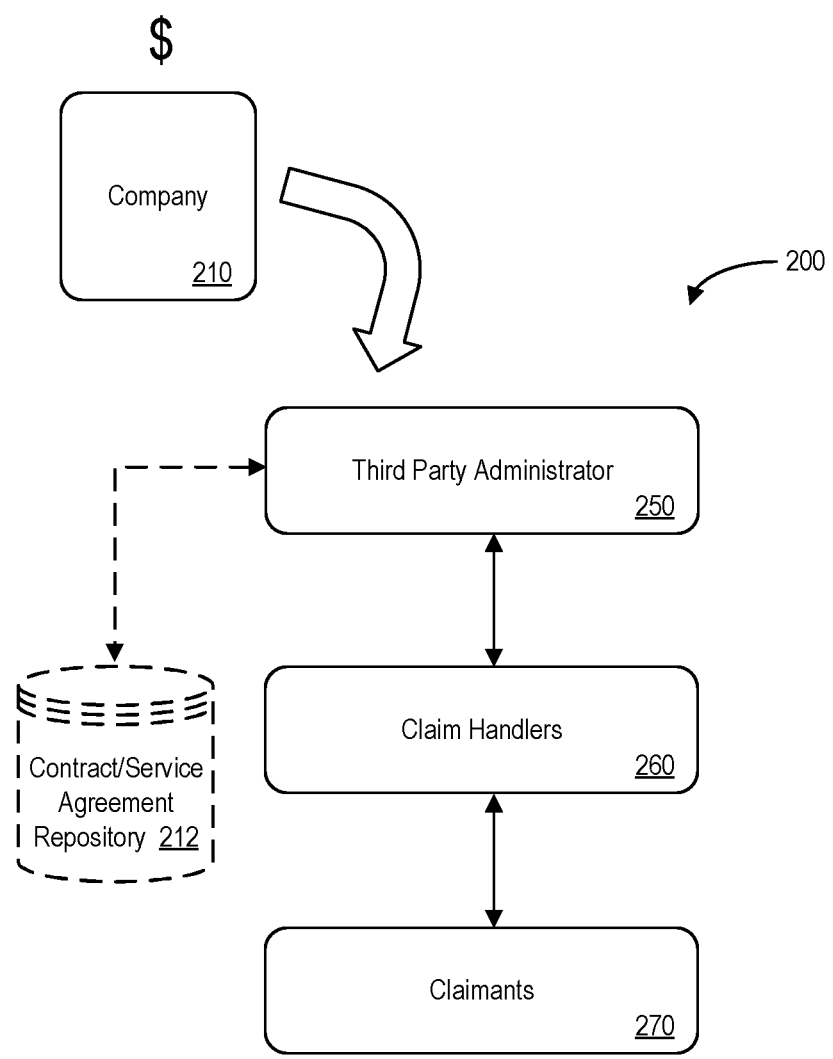
FIG. 2 is a high-level block diagram of an arrangement using a Third-Party Administrator to service workers' compensation claims of a self-insured company.

FIG. 2 is a high-level block diagram of an arrangement 200 using a Third-Party Administrator ("TPA") 250 to service workers' compensation claims of a "self-insured" company 210. As used herein, the phrase "self-insured" may refer to a risk management technique in which the company 210 sets aside a pool of money to be used to remedy an unexpected loss. That is, there is no risk relationship agreement between the company 210 and an insurer. Claim handlers 260 may process resource allocation requests from claimants 270. According to some embodiments, details about the arrangement 200 may be stored in an optional contracts/service agreement repository 212 (e.g., Service Level Agreement ("SLA") details). Note that embodiments may be associated with a Self-Insured Retention ("SIR") agreement which has a dollar amount specified in a contract that must be paid by the company 210 before an insurer will respond to a loss. Under an SIR contract, the company 210 (rather than the insurer) would pay defense and/or indemnity costs associated with a claim until the SIR limit was reached. After that point, the insurer may make any additional payments for defense and indemnity that were covered by the over-arching excess policy.

In some cases, a company might want to use a traditional arrangement 100 for some submitted claims while using a self-insured arrangement 200 for other submitted claims. For example, a company might want to utilze a self-insured approach for a headquarters while utilizing a traditional inured-insurer approach for satellite offices located throughout the country. Implementing such a hybrid approach, however, can be a difficult task for an insurer. For example, SIR "bundled" claim administration may be associated with a company that purchases a policy without any claims management services. The insurer provides all other policy management services including: filing coverage with the state, reporting claim data to various reporting agencies, and reporting claim information with an applicable state government. The insurer may also issue certificates of insurance if the company needs them for customers or vendors. The insurer may mitigate its risk by requiring collateral from the company for the payment of claims (usually in form of a letter of credit). This may provide the insurer an asset to draw upon if the company's financial condition deteriorates (and it cannot pay losses). Also note that each state has different rules and regulations regarding the administration of self-insured workers' compensation claims. For example, requirements in Electronic Data Interchange ("EDI") states may be complex making claims difficult to administer claims.

Figure 3:
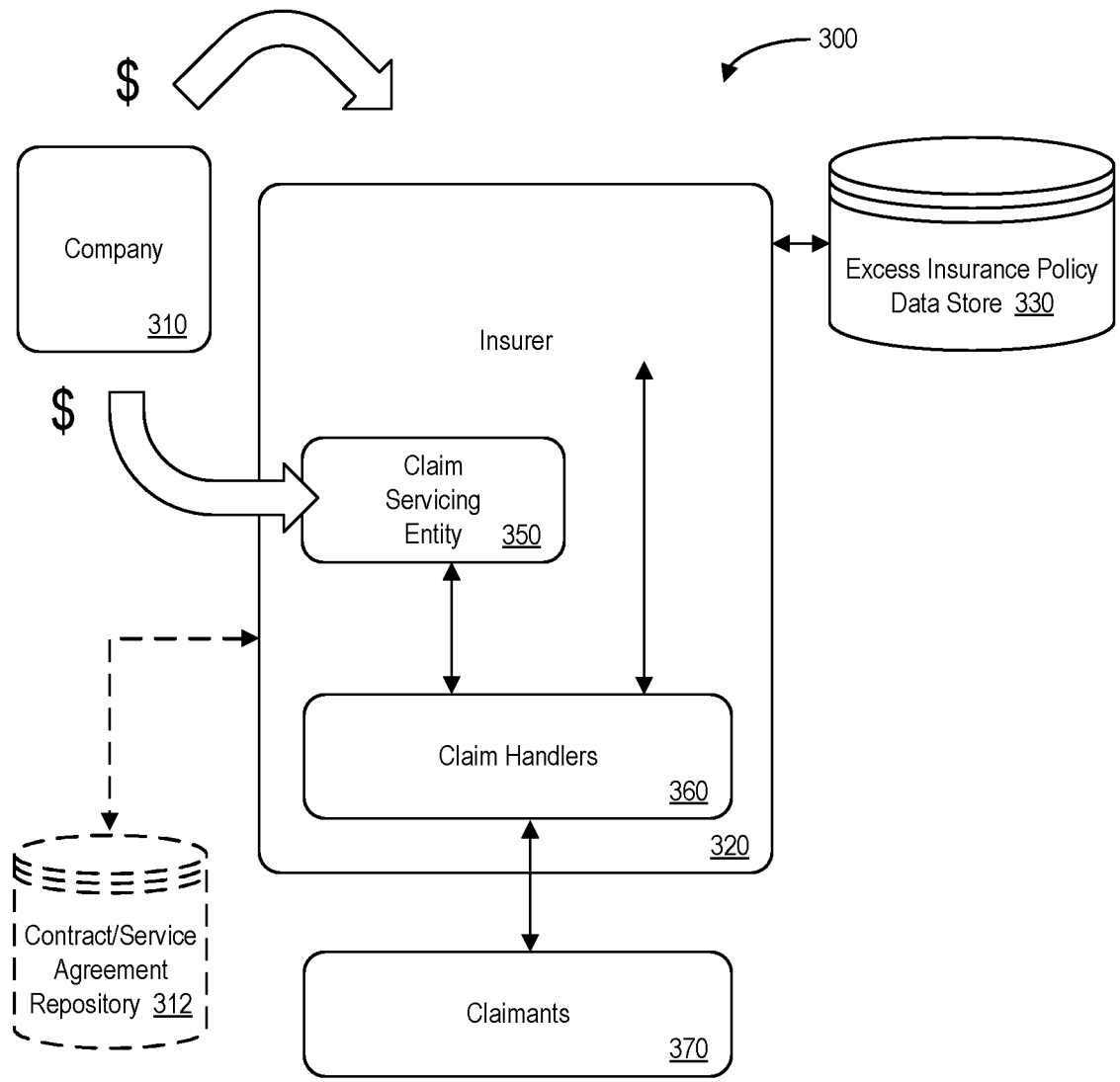
FIG. 3 is a hybrid risk relationship resource allocation servicing arrangement in accordance with some embodiments.

FIG. 3 is a hybrid risk relationship resource allocation servicing arrangement 300 in accordance with some embodiments. As in the traditional approach 100, a company 310 may enter a risk relationship (e.g., a workers' compensation insurance agreement) with an insurer 320 for certain employees or claims. Details about the relationship may be stored in an excess insurance policy data store 330 (e.g., a premium amount, terms and conditions, coverage information, etc.). Claim handlers 360 of the insurer 320 may process resource allocation requests (e.g., insurance claims) as they received from claimants 370 (e.g., injured workers). In this arrangement, however, a claim servicing entity 350 will service certain workers' compensation claims as a "self-insured" company 310. The claim handlers 360 may process self-insured resource allocation requests from claimants 370 for the claim servicing entity 350 (e.g., the same claim handlers 360 that process claims under the insurance policy). According to some embodiments, details about the arrangement 300 may be stored in an optional contracts/service agreement repository 312. The claim servicing entity 350 may comprise, for example, a Limited Liability Company ("LLC") with its own Tax Identification Number ("TIN") and/or Federal Employer Identification Number ("FEIN").

Figure 4:
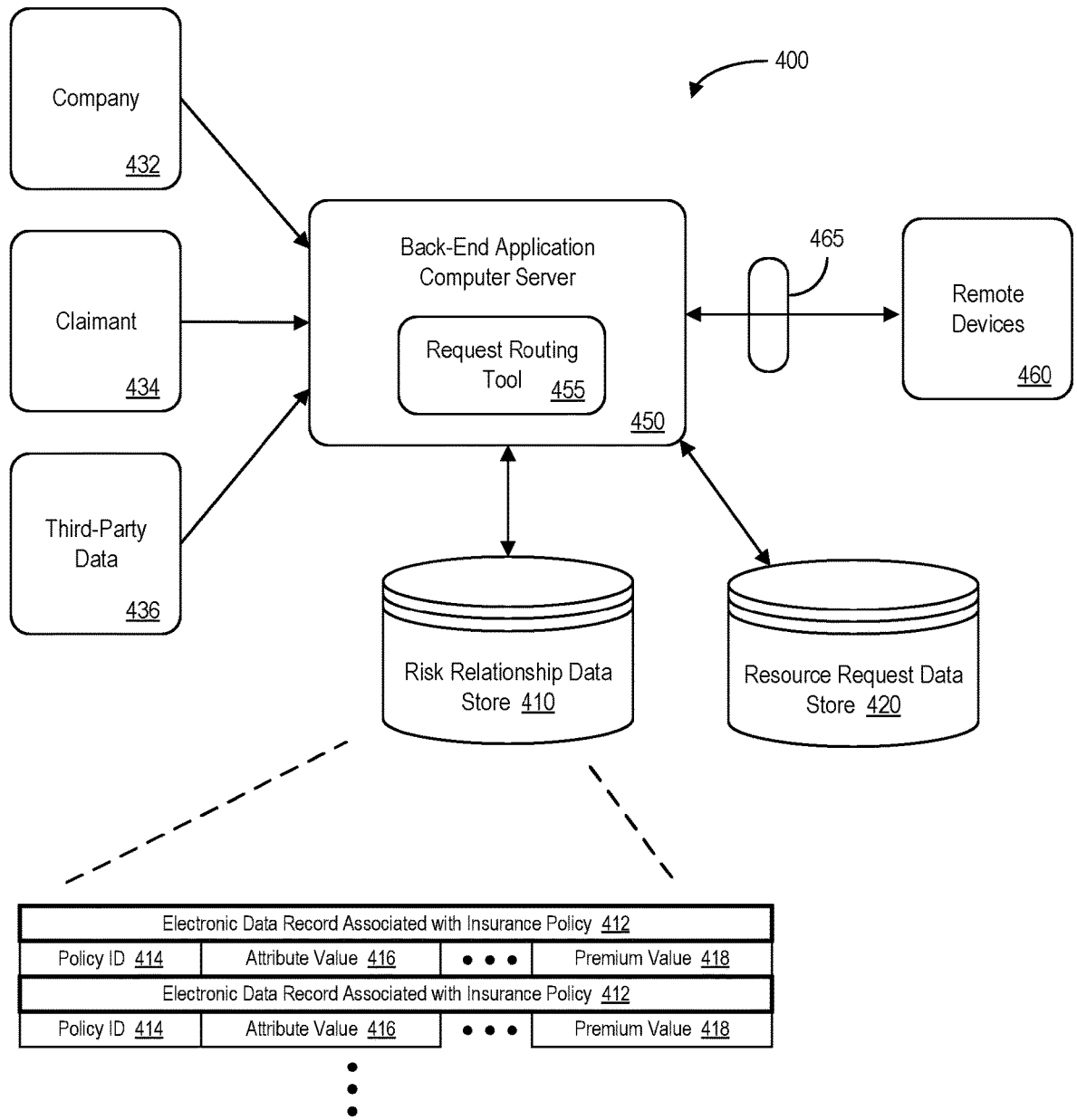
FIG. 4 is a more detailed hybrid risk relationship resource allocation servicing system in accordance with some embodiments.

FIG. 4 is a more detailed hybrid risk relationship resource allocation servicing system 400 in accordance with some embodiments of the present invention. In particular, the system 400 includes a back-end application computer server 450 (e.g., associated with an enterprise such as an insurance company or claim servicing entity) that may access information in a risk relationship data store 410 (e.g., storing a set of electronic records 412 representing risk relationships or associations, each record 412 including, for example, one or more risk relationship or insurance policy identifiers 414, attribute variables 416, premium values 4148, etc.) and/or a resource request data store 420 (e.g., storing records associated with workers' compensation insurance claims). The back-end application computer server 450 may also retrieve information from other data stores or sources—such as a company 432, a claimant 434, and third-party data 436 (e.g., storing credit scores, communication addresses, motor vehicle information, or court records)—in connection with a request routing tool 455 and apply algorithms and/or models to the electronic records (e.g., to help process insurance claims in an appropriate way). The back-end application computer server 450 may also exchange information with remote devices 460 (e.g., a workstation) associated with claim handler who process workers' compensation insurance claims (e.g., via a communication port 465 that might include a firewall). According to some embodiments, an interactive graphical user interface platform of the back-end application computer server 450 (and, in some cases, third-party data) may facilitate the display of information associated with the request routing tool 455 via one or more remote computers (e.g., to gather additional information about a contract, risk relationship, or resource allocation requests) and/or the remote device 460s. For example, the remote devices 460 may transmit updated information (e.g., an adjusted claim file) to the back-end application computer server 450. Based on the updated information, the back-end application computer server 450 may adjust data from the risk relationship data store 410 or a resource request data store 420 and automatically calculate and display updated values. Note that the back-end application computer server 450 and/or any of the other devices and methods described herein might be associated with a cloud-based environment and/or a third party, such as a vendor that performs a service for an enterprise.

The back-end application computer server 450 and/or the other elements of the system 400 might be, for example, associated with a Personal Computer ("PC"), laptop computer, smartphone, an enterprise server, a server farm, and/or a database or similar storage devices. According to some embodiments, an "automated" back-end application computer server 450 (and/or other elements of the system 400) may facilitate updates of electronic records in the risk relationship data store 410 and the resource request data store 420. As used herein, the term "automated" may refer to, for example, actions that can be performed with little (or no) intervention by a human.

As used herein, devices, including those associated with the back-end application computer server 450 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 450 may store information into and/or retrieve information from the risk relationship data store 410 and/or resource request data store 420. The risk relationship data store 410 might, for example, store electronic records representing a plurality of existing risk associations (e.g., workers' compensation insurance policies), each electronic record having a set of attribute values including a resource value (e.g., monetary amounts associated with premiums, deductibles, coverage limits, etc.). The data stores 410, 420 may also contain information about prior and current interactions with entities, including those associated with various companies 432 and claimants 434. The risk relationship data store 410 and/or resource request data store 420 may be locally stored or reside remote from the back-end application computer server 450. As will be described further below, the risk relationship data store 410 and/or the resource request data store 420 may be used by the back-end application computer server 450 in connection with the request routing tool 455 to automatically guide insurance claim processing. Although a single back-end application computer server 450 is shown in FIG. 4, any number of such devices may be included. Moreover, various devices described herein might be combined according to embodiments of the present invention. For example, in some embodiments, the back-end application computer server 450, the risk relationship data store 410, and/or the resource request data store 420 might be co-located and/or may comprise a single apparatus.

Figure 5:
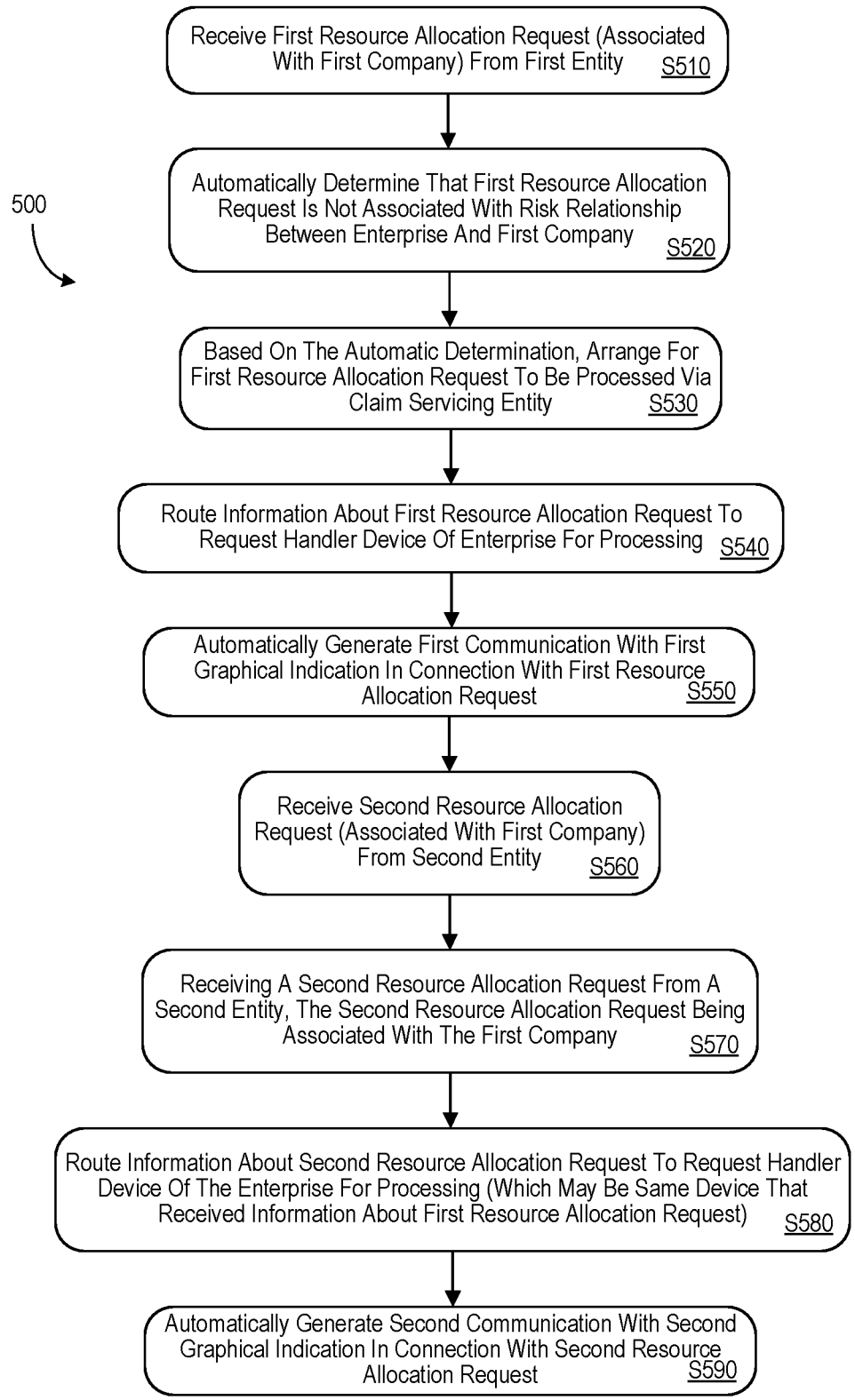
FIG. 5 illustrates a method according to some embodiments of the present invention.

Note that the system 400 of FIG. 4 is provided only as an example, and embodiments may be associated with additional elements or components. According to some embodiments, the elements of the system 400 automatically transmit information associated with a workers' compensation insurance claim over a distributed communication network. FIG. 5 illustrates a method 500 that might be performed by some or all of the elements of the system 400 described with respect to FIG. 4, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S510, a back-end application computer server of an enterprise (e.g., an insurer) may receive a first resource allocation request (e.g., a workers' compensation insurance claim) from a first entity (e.g., a claimant), the first resource allocation request being associated with a first company. At S520, the system may automatically determine that the first resource allocation request is not associated with a risk relationship between the enterprise and the first company. Based on the automatic determination, at S530 the system may arrange for the first resource allocation request to be processed via a claim servicing entity. At S540, the system may route information about the first resource allocation request to a request handler device (e.g., associated with a workers' compensation insurance claim handler) of the enterprise for processing. At S550, the system may automatically generate a first communication with a first graphical indication in connection with the first resource allocation request (e.g., on a check, invoice, web page, video chat system, etc.).

At S560, the back-end application computer server may receive a second resource allocation request from a second entity, the second resource allocation request being associated with the first company. At S570, the system may automatically determine that the second resource allocation request is to be processed in accordance with a risk relationship between the enterprise and the first company. At S580, the system may route information about the second resource allocation request to a request handler device of the enterprise for processing. Note that the request handler device may be the same device that received the information about the first resource allocation request. At S590, the system may automatically generate a second communication with a second graphical indication in connection with the second resource allocation request, wherein the second graphical indication is different than the first graphical indication. In this way, the system can help ensure that the party receiving the communication understands the role of the enterprise in the transaction.

According to some embodiments, the system may further include a communication port coupled to the back-end application computer server to facilitate a transmission of data with a remote device to support a graphical interactive user interface display via a distributed communication network. The interactive user interface display may provide information about processed resource allocation requests (e.g., so that an operator or administration can review and/or adjust operation of the system).

In some embodiments, an excess risk relationship data store may contain electronic records that represent a plurality of excess risk relationships between the enterprise and a plurality of companies. Each electronic record might include, for example, a relationship identifier and a set of attribute resource values associated with risk attributes. Similarly, a contract service agreement repository may contain electronic records that represent a plurality of service agreements between the enterprise and the plurality of companies.

In this way, embodiments may provide a singular entity that handles both normal workers' compensation claims and self-insured claims in a seamless way. In this way, a single enterprise can utilize the knowledge, experience, and capacity to handle different types of claims in an accurate and efficient way.

Figure 6:
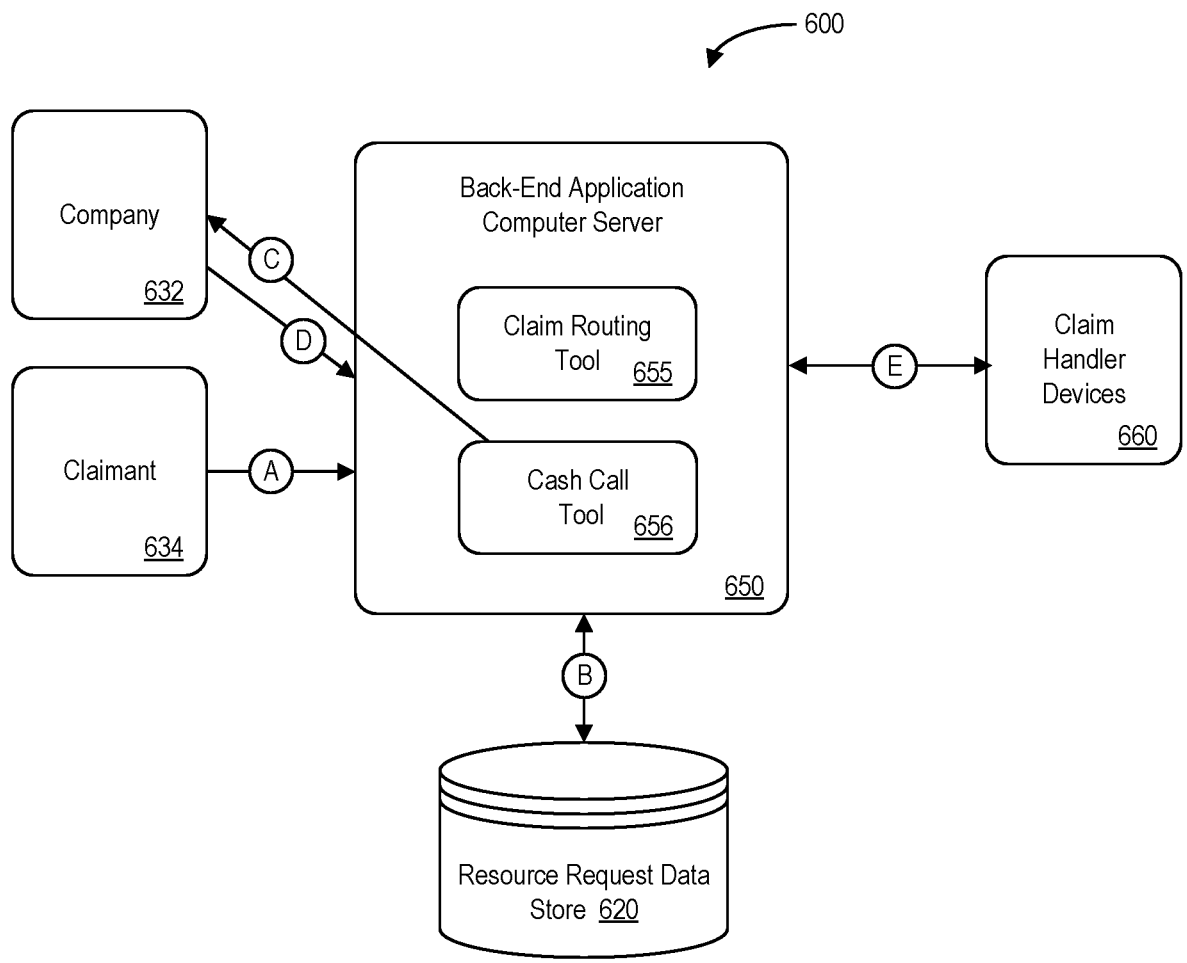
FIG. 6 illustrates a cash call system in accordance with some embodiments.

When a claim is handled as a "self-insured" type claim, the claim servicing entity might require that a company provide payment before the claimant receives a benefit. That is, because there is no insurance policy associated with the claim, the claim servicing entity may want to avoid the risk of first paying the claimant and then being reimbursed by the company (especially when the amount of payment is substantial). As a result, FIG. 6 illustrates a cash call system 600 in accordance with some embodiments. As before, the system 600 includes a back-end application computer server 650 (e.g., associated with a claim servicing entity) that may access information in a resource request data store 620 (e.g., storing records associated with workers' compensation insurance claims). The back-end application computer server 650 may also retrieve information from other data stores or sources—such as a company 632 and a claimant 634—in connection with a claim routing tool 655 and a cash call tool 656 and apply algorithms and/or models to the electronic records (e.g., to help process insurance claims in an appropriate way). The back-end application computer server 650 may also exchange information with remote claim handler devices 660 (e.g., workstations).

At (A), a claimant 634 may submit a workers' compensation insurance claim to the back-end application computer server 650 and information about the claim may be stored into the resource request data store 620 at (B). If the claim meets certain conditions (e.g., the claim is self-insured and associated with a value over a pre-determined threshold), the cash call tool 656 may request pre-payment from the company 632 at (C). Only after the company 632 pre-pays at (D), will the claim servicing entity authorize the claim handler device 660 at (E) to provide payment to the claimant 634.

Figure 7:
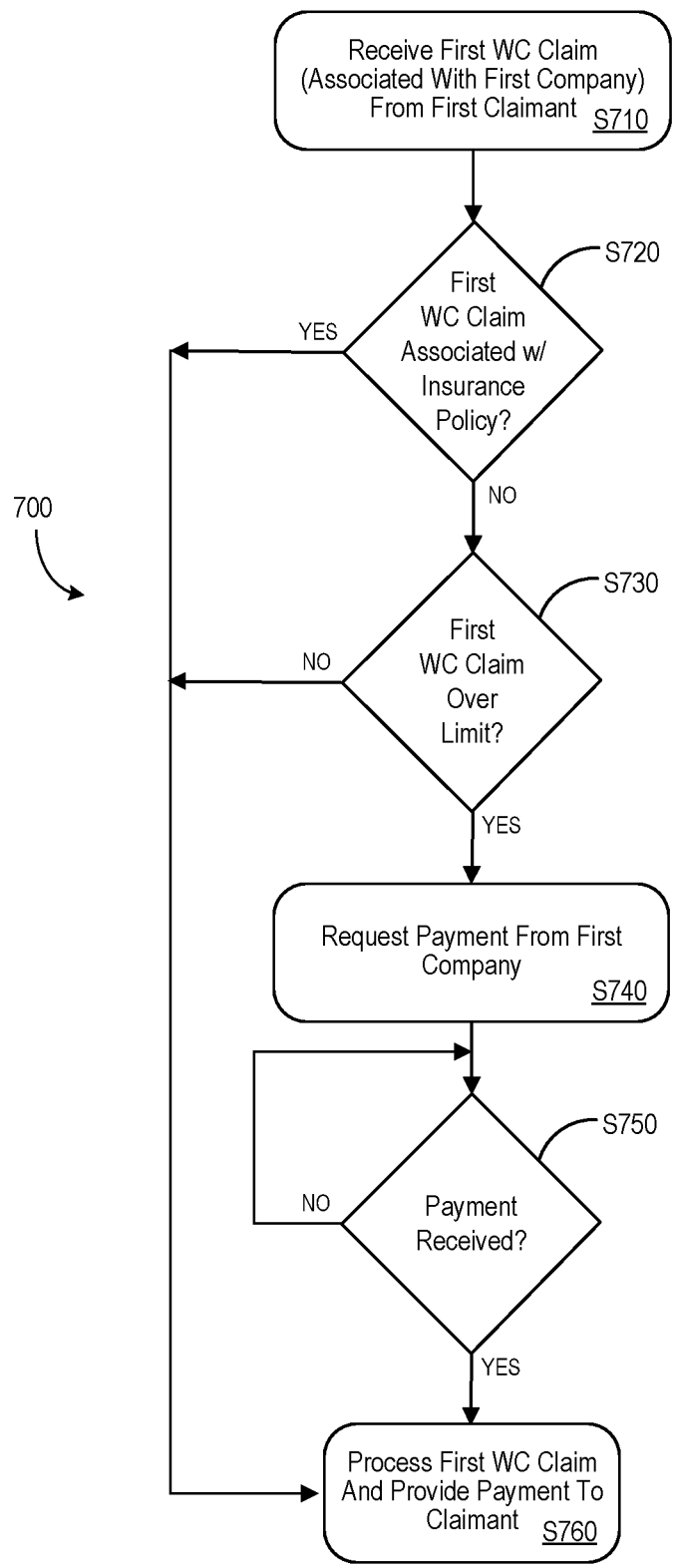
FIG. 7 illustrates a cash call method according to some embodiments.

FIG. 7 illustrates a cash call method 700 according to some embodiments. At S710, a first workers' compensation claim (associated with a first company) may be received from a first claimant. At S720, it may be determined if the first workers' compensation claim is associated with an insurance policy. If so, the system processes the first workers' compensation claim and provides payment to the claimant at S760.

If there is no insurance policy at S720 (that is, the claim is "self-insured"), the system determines if the first workers' compensation insurance claim is over a pre-determined limit (e.g., $100,000) at S730. If the claim is not over the limit at S730, the system processes the first workers' compensation claim and provides payment to the claimant at S760 (e.g., the amount of risk assumed by the claim servicing entity is relatively small).

If the claim is over the limit at S730, the system requests payment from the first company at S740 (a "cash call"). Only after payment is received at S750, will the system process the first workers' compensation claim and provides payment to the claimant at S760 (e.g., no risk is assumed by the claim servicing entity which has already received payment).

Figure 8:
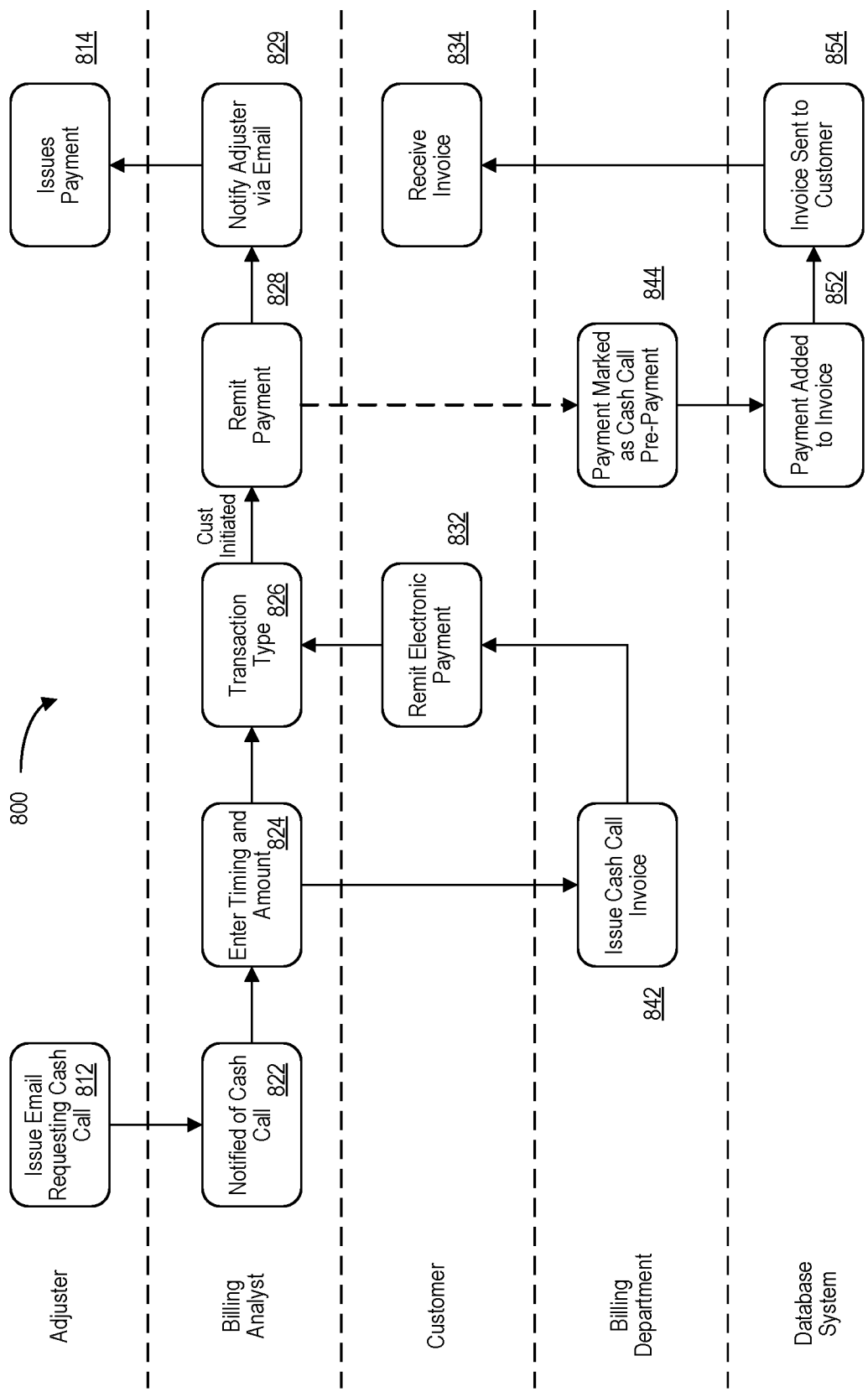
FIG. 8 is an information flow diagram in accordance with some embodiments.

FIG. 8 is an information flow diagram 800 in accordance with some embodiments. At 812, an insurance claim adjuster may use an Account Service Agreement ("ACA") to understand specific cash call requirements for a large SIR handling. A billing analyst may be notified of a cash call at 822 and enter timing and a cash value amount at 824. For pending settlements and/or groups of payments that need to be made above a cash call threshold, the adjuster might transmit an email to a specialty billing mailbox. The email might contain, for example:

an account name;
a cash call amount (the total the company should advance fund);
a service number;
a policy number;
policy effective dates;
a claimant;
a claim number; and
a date of loss.

A billing department may then issue a cash call invoice within a pre-determined period of time (e.g., 1 business day) at 842. The company will then have a period of time (e.g., 3 business days) to execute an Electronic Funds Transfer ("EFT") providing payment to a billing lockbox at 832. When payment is received by the billing analyst, the transaction type may be noted at 826 and payment may be remitted at 828. The billing analyst may then email the adjuster that the cash has been received at 829 and the adjuster may issue payment at 814. The cash call can then be applied to the next invoice. For example, the billing department may mark the payment as a cash call pre-payment at 844, and the payment may be added to an invoice at 852 in connection with a database system (e.g., a database system associated with national accounts of an insurance enterprise). That invoice may then be sent from the database system (854) and received by the customer (834). Note that the invoice and/or other communications may make the role the enterprise is performing in the transactions clear (e.g., whether or not the enterprise is acting as an insurer).

Figure 9:
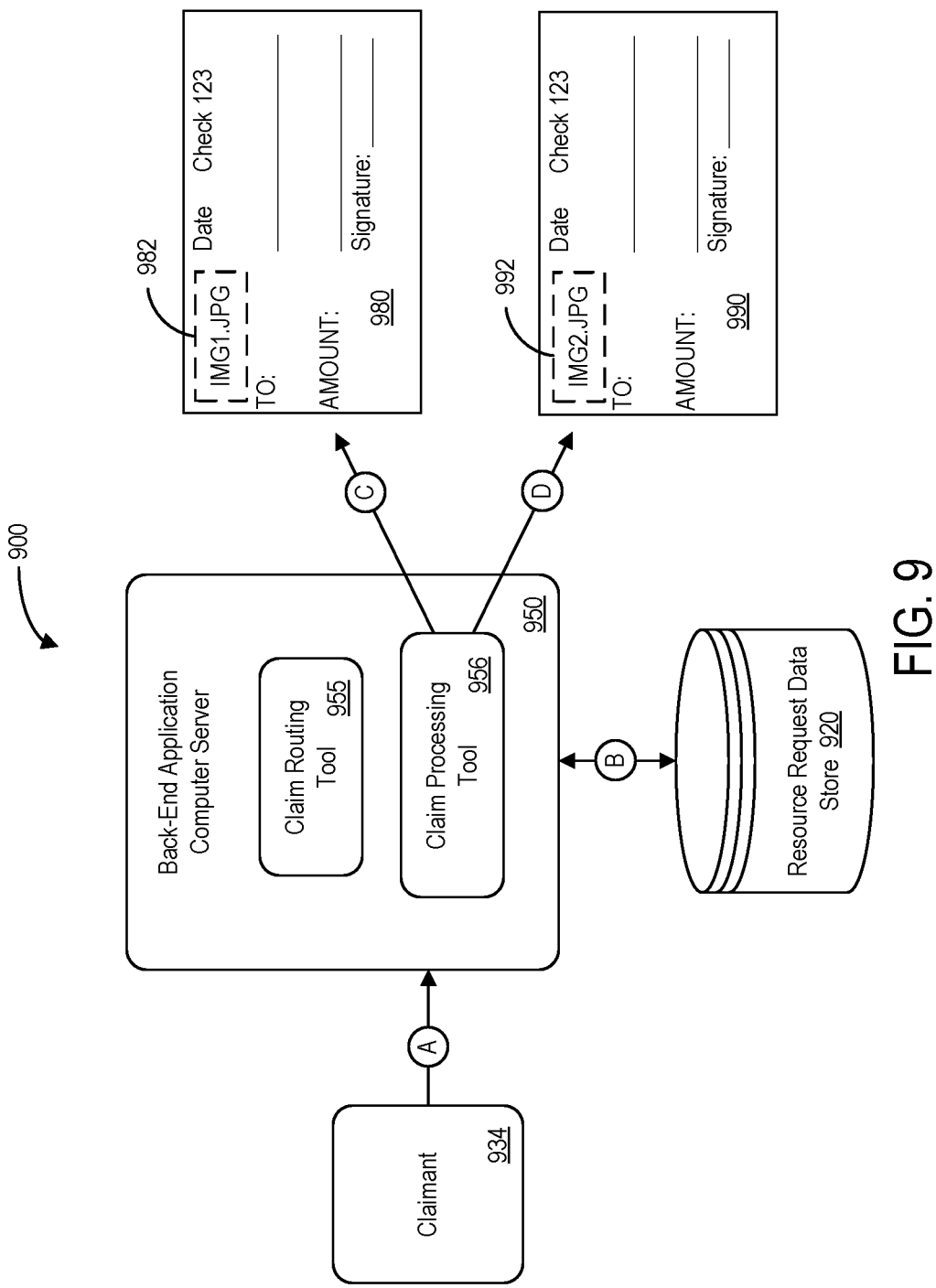
FIG. 9 illustrates a payment processing system according to some embodiments.

Since some workers' compensation claims might be handled under an insurance policy while other claims are handled as "self-insured," it might be important for an enterprise to make it clear when it is (and when it is not) acting as an insurer. For example, FIG. 9 illustrates a payment processing system 900 according to some embodiments. As before, the system 900 includes a back-end application computer server 950 (e.g., associated with a claim servicing entity) that may access information in a resource request data store 920 (e.g., storing records associated with workers' compensation insurance claims). The back-end application computer server 950 may also retrieve information from other data stores or sources—such as a claimant 934—in connection with a claim routing tool 955 and a claim processing tool 956 and apply algorithms and/or models to the electronic records (e.g., to help process insurance claims in an appropriate way). The back-end application computer server 950 may then transmit payment checks, invoices, etc. as the claim is being processed.

At (A), a claimant 934 may submit a workers' compensation insurance claim to the back-end application computer server 950 and information about the claim may be stored into the resource request data store 920 at (B). If the claim processing tool 956 determines that the claim is not associated with a risk relationship, it may arrange to process a transfer 980 (e.g., a check or invoice) via a first graphical indication 982 at (C). If the claim processing tool 956 determines that the second first resource allocation request is to be processed in accordance with a risk relationship between the enterprise and first company, it may arrange to process a transfer 990 via a second graphical indication 992 at (D). The second graphical indication 992 may be different than the first graphical indication 982 (e.g., an might include a name, address, logo, etc.).

Note that either the first or second graphical indication might be associated with an image, a logo, a processing party name, an address, contact information, etc., on a postal mailing, web site, video conferencing background, or any other type of communication. Moreover, the determination that a resource allocation request is not associated with a risk relationship between the enterprise and the first company (or instead that it is in fact associated with such a relationship) might be based on a claimant identifier, a business rule, an algorithm, an automated analysis of a resource allocation request, etc.

Figure 10:
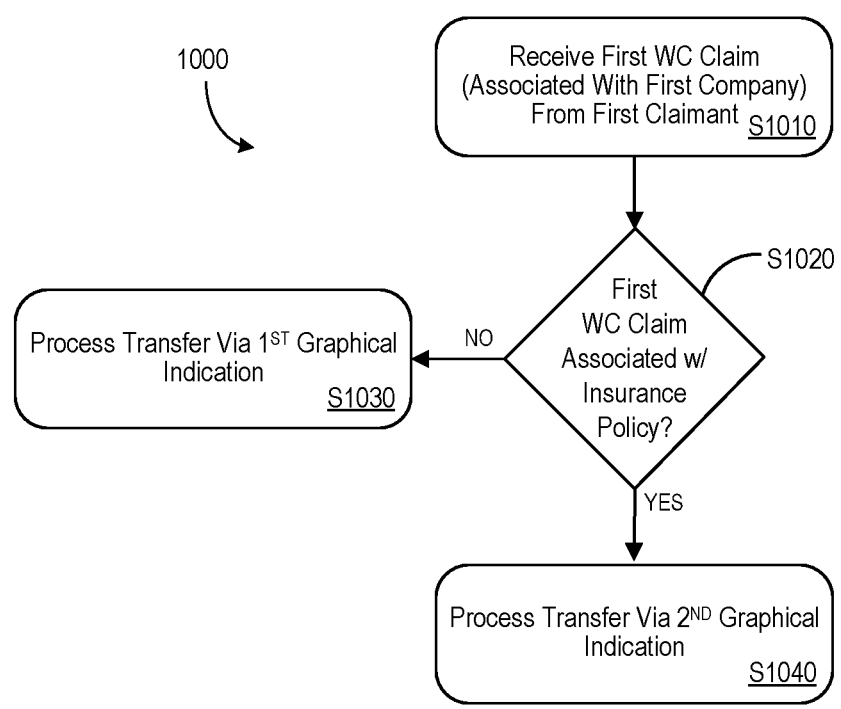
FIG. 10 illustrates a payment processing method in accordance with some embodiments.

FIG. 10 illustrates a payment processing method 1000 in accordance with some embodiments. At S1010 the system may receive a first workers' compensation claim (associated with a first company) from a first claimant. If the first workers' compensation claim is not associated with an insurance policy at S1020 (that is, it is a "self-insured" claim), a transfer is processed via a first graphical indication at S1030. If the first workers' compensation claim is associated with an insurance policy at S1020, a transfer is processed via a second graphical indication at S1040. In this way, an enterprise may make it clear when it is (and when it is not) acting as an insurer and avoid confusion.

Figure 11:
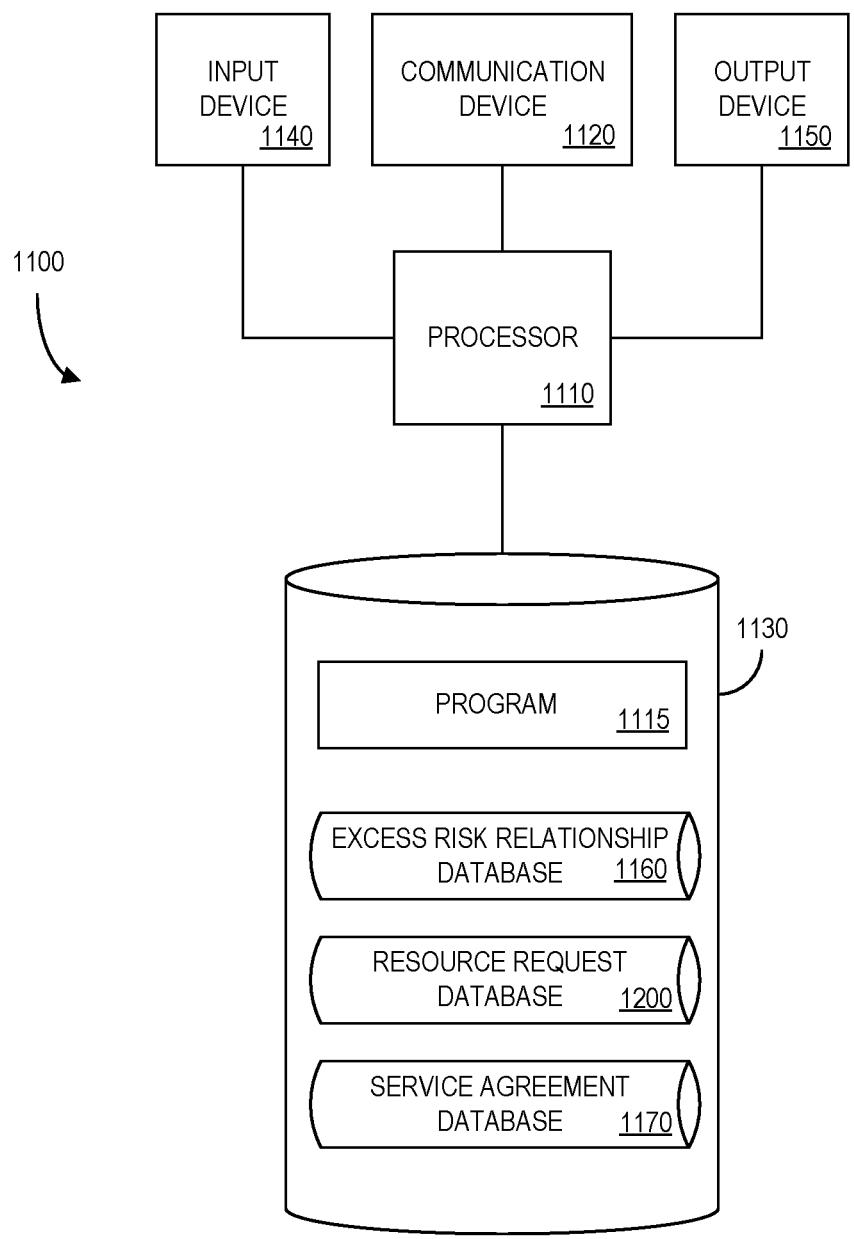
FIG. 11 is a block diagram of an apparatus in accordance with some embodiments of the present invention.

The embodiments described herein may be implemented using any number of different hardware configurations. For example, FIG. 11 illustrates an apparatus 1100 that may be, for example, associated with the system 400 described with respect to FIG. 4. The apparatus 1100 comprises a processor 1110, such as one or more commercially available Central Processing Units ("CPUs") in the form of one-chip microprocessors, coupled to a communication device 1120 configured to communicate via communication network (not shown in FIG. 11). The communication device 1120 may be used to communicate, for example, with one or more remote claim handler/customer computers and or communication devices (e.g., PCs and smartphones). Note that communications exchanged via the communication device 1120 may utilize security features, such as those between a public internet user and an internal network of the insurance enterprise. The security features might be associated with, for example, web servers, firewalls, and/or PCI infrastructure. The apparatus 1100 further includes an input device 1140 (e.g., a mouse and/or keyboard to enter information about a company, a claimant, an insurance claim, insurance details, etc.) and an output device 1150 (e.g., to output reports regarding works' compensation insurance claim processing).

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1115 and/or a risk analysis tool or application for controlling the processor 1110. The processor 1110 performs instructions of the program 1115, and thereby operates in accordance with any of the embodiments described herein. For example, the processor 1110 may receive a first resource allocation request (associated with a first company) from a first entity. The processor 1110 may determine that the first request is not associated with a risk relationship and arrange for it to be processed via a claim servicing entity. Information about the first request may then be routed to a request handler device for processing and a communication with a first graphical indication may be generated. The processor 1110 may also receive a second resource allocation request (associated with the first company) from a second entity and determine that it is to be processed via a risk. The processor 1110 may then route information about the second request to a request handler device for processing and generate a communication with a second graphical indication. Note that the request handler device may be the same device that received the information about the first request.

The program 1115 may be stored in a compressed, uncompiled and/or encrypted format. The program 1115 may furthermore include other program elements, such as an operating system, a database management system, and/or device drivers used by the processor 1110 to interface with peripheral devices.

As used herein, information may be "received" by or "transmitted" to, for example: (i) the back-end application computer server 1100 from another device; or (ii) a software application or module within the back-end application computer server 1100 from another software application, module, or any other source.

In some embodiments (such as shown in FIG. 11), the storage device 1130 further stores an excess risk relationship database 1160, a resource request database 1200, and a service agreement database 1170. An example of a database that might be used in connection with the apparatus 1100 will now be described in detail with respect to FIG. 12. Note that the database described herein is only an example, and additional and/or different information may be stored therein. Moreover, various databases might be split or combined in accordance with any of the embodiments described herein. For example, the resource request database 1200 and the excess risk relationship database 1160 might be combined and/or linked to each other within the program 1115.

Figure 12:
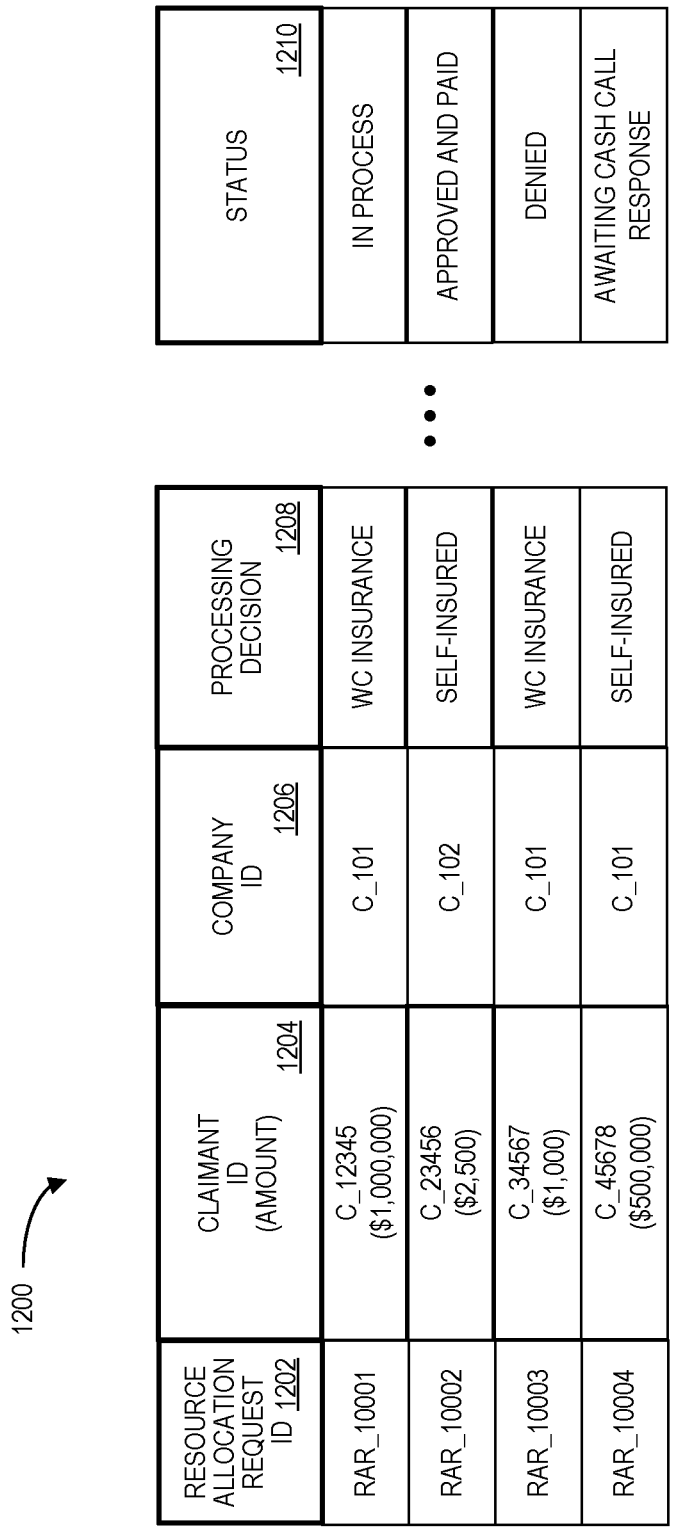
FIG. 12 is a portion of a tabular resource request database according to some embodiments.

Referring to FIG. 12, a table is shown that represents the resource request database 1200 that may be stored at the apparatus 1200 according to some embodiments. The table may include, for example, entries associated with workers' compensation claims. The table may also define fields 1202, 1204, 1206, 1208, 1210 for each of the entries. The fields 1202, 1204, 1206, 1208, 1210 may, according to some embodiments, specify: a resource allocation request identifier 1202, a claimant identifier and amount 1204, a company identifier 1206, a processing decision 1208, and a status 1210. The risk relation database 1200 may be created and updated, for example, based on information electrically received from various claimant computer systems, including those associated with an insurer.

The resource allocation request identifier 1202 may be, for example, a unique alphanumeric code identifying (or a link to) a workers' compensation insurance claim (that might or might not be associated with a risk relationship such as an insurance policy). The claimant identifier and amount 1204 might indicate a worker name or number and an amount associated with the claim. The company identifier 1206 might identify the insured and the processing decision 1208 might indicate whether the claim is self-insured or covered under a workers' compensation insurance policy. The status 1210 might indicate the current state of the claim (e.g., in process, approved, etc.). By way of example, because "RAR_10004" had processing decision 1208 of "self-insured" and the amount 1204 was substantial, the status 1210 might comprise "awaiting cash call response."

Figure 13:
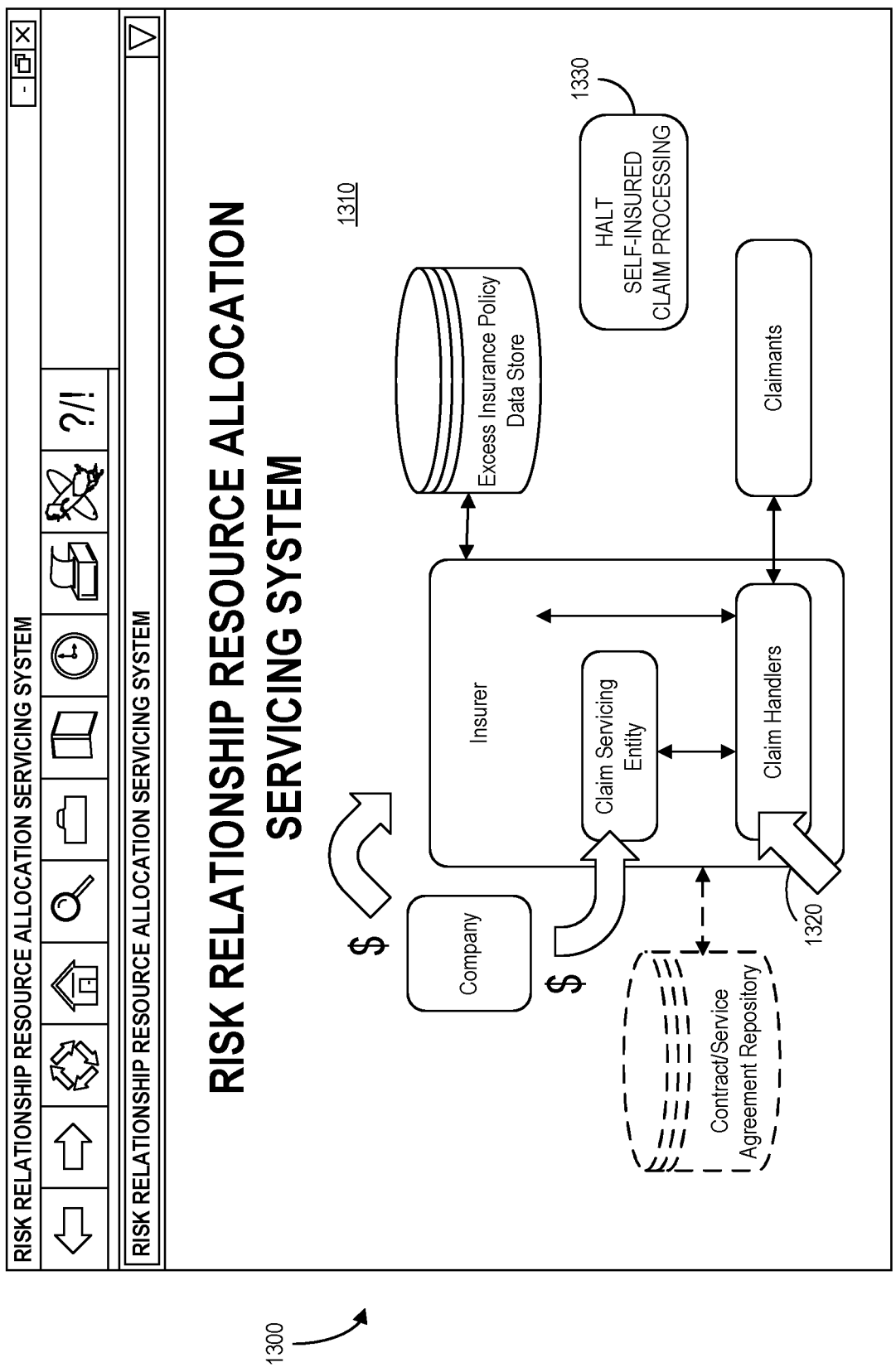
FIG. 13 is an example of a risk relationship resource allocation request display in accordance with some embodiments.

FIG. 13 is an example of a risk relationship resource allocation servicing system display 1300 in accordance with some embodiments. The display 1300 provides a graphical depiction 1310 of elements of a claim servicing entity framework to an operator via an interactive interface that allows the operator to adjust system components as appropriate. For example, selection of an item on the display 1300 (e.g., via a touchscreen or computer mouse pointer 1320) may let the operator see more information about that particular item in a pop-up window and/or adjust operation of that item (e.g., by determining or over-riding the current status of a workers' compensation insurance claim). According to some embodiments, the display 1300 further includes a user-selectable "halt self-insured claim processing" icon 1330 that can be activated to generate a resource allocation halt signal associated with a company. Responsive to the resource allocation halt signal, the system may flag future resource allocation requests associated with the company that are not associated with a risk relationship between the enterprise and the company (while still processing claims covered under an insurance policy).

Thus, embodiments may provide an automated and efficient way to provide risk relationship resource allocation request servicing in a way that provides faster and more efficient results as compared to traditional approaches. Embodiments may enhance claim service to deliver more value to customers and distribution partners with loss-sensitive workers' compensation exposures. Specifically, embodiments may handle self-insured workers' compensation claims for those customers who have excess workers compensation policies via a claim servicing entity. In this way, a similar claims experience to may be delivered to customers with self-insured and loss-sensitive workers' compensation claims. The ability to offer self-insured, loss-sensitive workers' compensation claims handling may enable an insurer to grow business and improve perception in the marketplace as it relates to broader appetite, innovation and flexibility. Additionally, companies may prefer to keep their traditional loss-sensitive and self-insured workers' compensation programs together with the same claims administrator.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems).

Figure 14:
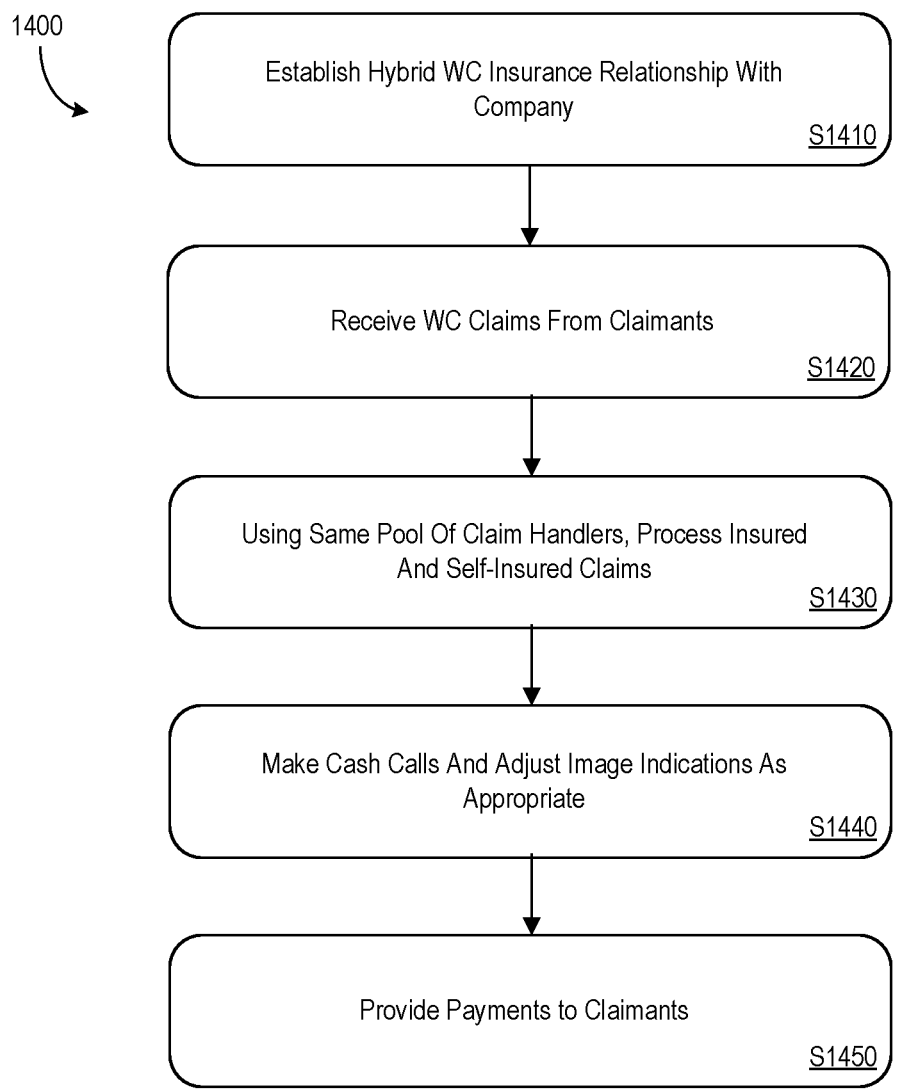
FIG. 14 illustrates an overall process in accordance with some embodiments.

Moreover, although embodiments have been described with respect to particular types of insurance policies, embodiments may instead be associated with other types of insurance policies or arrangements in additional to and/or instead of the policies described herein (e.g., general liability insurance, automobile insurance, etc.). FIG. 14 illustrates an overall business process 1400 in accordance with some embodiments. At S1410, a hybrid workers' compensation relationship may be established between an insurer and a company. At S1420, workers' compensation insurance claims may be received from claimants. These claims may then be processed (including both self-insured claims and insured claims) using the same pool of claim handlers at S1430. At S1440, the insurer (and/or claim servicing entity) may make cash calls and adjust image indications (e.g., on checks and invoices) as appropriate. At S1450, payments may be provided to claimants as the workers' compensation insurance claims are processed.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to provide resource allocation request servicing for risk relationships via a back-end application computer server of an enterprise, comprising:
   (a) the back-end application computer server, including:
      a computer processor, and
      a computer memory coupled to the computer processor and storing program instructions that, when executed by the computer processor, cause the back-end application computer server to:
      (i) receive a first resource allocation request from a first entity, the first resource allocation request being associated with a first company,
      (ii) access a plurality of records in a risk relationship data store associated with an encrypted database management system,
      (iii) in response to the access, automatically determine that the first resource allocation request is not associated with a risk relationship between the enterprise and the first company, the determination based on the back-end application computer server accessing a plurality of records in the risk relationship data store and determining at least one identifier associated with the request is absent from the risk relationship data store;
      (iv) based on the automatic determination, arrange for the first resource allocation request to be processed via a claim servicing entity, wherein resource allocation requests that are determined to be associated with the risk relationship between the enterprise and the first company are not processed via the claim servicing entity thereby reducing a number of electronic messages transmitted via a distributed communication network,
      (v) route information about the first resource allocation request to a request handler device of the enterprise for processing, (vi) automatically generate a first communication with a first graphical indication in connection with the first resource allocation request, (vii) receive a second resource allocation request from a second entity, the second resource allocation request being associated with the first company, (viii) automatically determine that the second resource allocation request is to be processed in accordance with the risk relationship between the enterprise and the first company, (ix) route information about the second resource allocation request to a request handler device of the enterprise for processing, wherein the request handler device may be the same device that received the information about the first resource allocation request, and (x) automatically generate a second communication with a second graphical indication in connection with the second resource allocation request, wherein the second graphical indication is different than the first graphical indication;

(b) a communication port coupled to the back-end application computer server to facilitate a transmission of data with a remote device to support a graphical interactive user interface display via security features of the distributed communication network, the interactive user interface display providing information about processed resource allocation requests; and (c) a remote claim handler device for handling insurance claims and displaying information provided by the back-end application computer server;

wherein the back-end application computer server facilitates updating of electronic records in the risk relationship data store by:

automatically, via a first algorithm, adjusting data in the risk relationship data store in response to received updated information; and automatically, via a second algorithm, calculating and displaying updated values on the graphical interactive user interface display based on the updated information in real time, so that each entity has immediate access to the updated values.

2. The system of claim 1, further comprising:

(d) the risk relationship data store containing electronic records that represent a plurality of excess risk relationships between the enterprise and a plurality of companies, wherein each electronic record includes a relationship identifier as one of the at least one identifiers and a set of attribute resource values associated with risk attributes.

3. The system of claim 2, further comprising:

(e) a contract service agreement repository containing electronic records that represent a plurality of service agreements between the enterprise and the plurality of companies.

4. The system of claim 1, wherein the back-end application computer server is further programmed to:

after determining that the first resource allocation request is not associated with the risk relationship, detect that the first resource allocation request is associated with a value above a pre-determined threshold value and, responsive to this detection, request an advance resource transfer from the first company.

5. The system of claim 4, wherein the back-end application computer server is further programmed to:

upon completion of the advance resource transfer from the first company, arrange a resource transfer to the first entity.

6. The system of claim 1, wherein said first graphical indication is associated with at least one of: (i) an image, (ii) a logo, (iii) a processing party name, (iv) an address, and (v) contact information.

7. The system of claim 1, wherein said determination that the first resource allocation request is not associated with the risk relationship between the enterprise and the first company is based at least in part on: (i) a claimant identifier, (ii) a business rule, (iii) an algorithm, and (iv) an automated analysis of the first resource allocation request.

8. The system of claim 1, wherein the enterprise comprises an insurer, the first and second entities are claimants, and the resource allocation request is a workers' compensation insurance claim.

9. The system of claim 8, wherein the request handler device is associated with an insurance claim handler.

10. The system of claim 1, wherein the back-end application computer server is further to:

receive a resource allocation halt signal associated with the first company, and responsive to the resource allocation halt signal, flag future resource allocation requests associated with the first company that are not associated with the risk relationship between the enterprise and the first company.

11. A computerized method to provide resource allocation request servicing for risk relationships via a back-end application computer server of an enterprise, the back-end application computer server including a computer processor and a memory device in communication with the computer processor, the memory device storing program instructions for controlling the computer processor, comprising:

receiving, by a computer processor of the back-end application computer server, a first resource allocation request from a first entity, the first resource allocation request being associated with a first company;

accessing, by the back-end application computer server, a plurality of records in a risk relationship data store associated with an encrypted database management system;

in response to the accessing, automatically determining that the first resource allocation request is not associated with a risk relationship between the enterprise and the first company, the determination based on the back-end application computer server determining at least one identifier associated with the request is absent from the accessed risk relationship data store;

based on the automatic determination, arranging for the first resource allocation request to be processed via a claim servicing entity, wherein resource allocation requests that are determined to be associated with the risk relationship between the enterprise and the first company are not processed via the claim servicing entity thereby reducing a number of electronic messages transmitted via a distributed communication network;

routing information about the first resource allocation request to a request handler device of the enterprise for processing;

automatically generating a first communication with a first graphical indication in connection with the first resource allocation request;

receiving a second resource allocation request from a second entity, the second resource allocation request being associated with the first company;
automatically determining that the second resource allocation request is to be processed in accordance with the risk relationship between the enterprise and the first company;
routing information about the second resource allocation request to a request handler device of the enterprise for processing, wherein the request handler device may be the same device that received the information about the first resource allocation request;
automatically generating a second communication with a second graphical indication in connection with the second resource allocation request, wherein the second graphical indication is different than the first graphical indication; and
providing information from the back-end application computer server to a remote claim handler device via security features, the remote claim handler device handling insurance claims and displaying the information provided from the back-end application computer server;
wherein the back-end application computer server facilitates updating of electronic records in the risk relationship data store by:
  automatically, via a first algorithm, adjusting data in the risk relationship data store in response to received updated information; and
  automatically, via a second algorithm, calculating and displaying updated values on the graphical interactive user interface display based on the updated information in real time, so that each entity has immediate access to the updated values.

12. The method of claim 11, further comprising:
after determining that the first resource allocation request is not associated with the risk relationship, detecting that the first resource allocation request is associated with a value above a pre-determined threshold value and, responsive to this detection, request an advance resource transfer from the first company.

13. The method of claim 12, wherein the back-end application computer server is further programmed to:
upon completion of the advance resource transfer from the first company, arranging a resource transfer to the first entity.

14. A non-transitory, computer-readable medium storing instructions, that, when executed by a processor, cause the processor to perform a method to provide resource allocation request servicing for risk relationships via a back-end application computer server of an enterprise, the back-end application computer server including a computer processor and a memory device in communication with the computer processor, the memory device storing program instructions for controlling the computer processor, the method comprising:
receiving, by a computer processor of the back-end application computer server, a first resource allocation request from a first entity, the first resource allocation request being associated with a first company;
accessing, by the back-end application computer server, a plurality of records in a risk relationship data store associated with an encrypted database management system;
in response to the access, automatically determining that the first resource allocation request is not associated with a risk relationship between the enterprise and the first company, the determination based on the back-end application computer server determining at least one identifier associated with the request is absent from the accessed risk relationship data store;
based on the automatic determination, arranging for the first resource allocation request to be processed via a claim servicing entity, wherein resource allocation requests that are determined to be associated with the risk relationship between the enterprise and the first company are not processed via the claim servicing entity thereby reducing a number of electronic messages transmitted via a distributed communication network;
routing information about the first resource allocation request to a request handler device of the enterprise for processing;
automatically generating a first communication with a first graphical indication in connection with the first resource allocation request;
receiving a second resource allocation request from a second entity, the second resource allocation request being associated with the first company;
automatically determining that the second resource allocation request is to be processed in accordance with the risk relationship between the enterprise and the first company;
routing information about the second resource allocation request to a request handler device of the enterprise for processing, wherein the request handler device may be the same device that received the information about the first resource allocation request;
automatically generating a second communication with a second graphical indication in connection with the second resource allocation request, wherein the second graphical indication is different than the first graphical indication, and
providing information from the back-end application computer server to a remote claim handler device via security features, the remote claim handler device handling insurance claims and displaying the information provided from the back-end application computer server;
wherein the back-end application computer server facilitates updating of electronic records in the risk relationship data store by:
  automatically, via a first algorithm, adjusting data in the risk relationship data store in response to received updated information; and
  automatically, via a second algorithm, calculating and displaying updated values on the graphical interactive user interface display based on the updated information in real time, so that each entity has immediate access to the updated values.

15. The medium of claim 14, wherein said first graphical indication is associated with at least one of: (i) an image, (ii) a logo, (iii) a processing party name, (iv) an address, and (v) contact information.

16. The medium of claim 14, wherein said determination that the first resource allocation request is not associated with the risk relationship between the enterprise and the first company is based at least in part on: (i) a claimant identifier, (ii) a business rule, (iii) an algorithm, and (iv) an automated analysis of the first resource allocation request.

17. The medium of claim 14, wherein the enterprise comprises an insurer, the first and second entities are claimants, and the resource allocation request is a workers' compensation insurance claim.

18. The medium of claim 17, wherein the request handler device is associated with an insurance claim handler.

19. The medium of claim 14, wherein the method further comprises:
   receiving a resource allocation halt signal associated with the first company, and
   responsive to the resource allocation halt signal, flagging future resource allocation requests associated with the first company that are not associated with the risk relationship between the enterprise and the first company.

20. The medium of claim 14, wherein the back-end application computer server exchanges information with at least one of: (i) an excess risk relationship data store, and (ii) a contract service agreement repository.

* * * * *